(12) United States Patent
Hall et al.

(10) Patent No.: US 10,680,883 B2
(45) Date of Patent: Jun. 9, 2020

(54) DEVICES AND SYSTEMS FOR CONSUMER-INSTALLED HUB-BASED INTERMEDIATE-RANGE PACKETIZED WIRELESS NETWORKS UTILIZING ASSIGNABLE OPERATIONAL CHANNELS

(71) Applicants: David R. Hall, Provo, UT (US); Mark Hall, Springville, UT (US); Craig Boswell, Draper, UT (US); Everett D. Robinson, Pleasant Grove, UT (US)

(72) Inventors: David R. Hall, Provo, UT (US); Mark Hall, Springville, UT (US); Craig Boswell, Draper, UT (US); Everett D. Robinson, Pleasant Grove, UT (US)

(73) Assignee: Hall Labs LLC, Provo, UT (US)

( * ) Notice: Subject to any disclaimer, the term of this patent is extended or adjusted under 35 U.S.C. 154(b) by 190 days.

(21) Appl. No.: 15/398,343

(22) Filed: Jan. 4, 2017

(65) Prior Publication Data

US 2018/0191564 A1 Jul. 5, 2018

(51) Int. Cl.
*H04L 12/24* (2006.01)
*H04W 76/14* (2018.01)
(Continued)

(52) U.S. Cl.
CPC ......... *H04L 41/0806* (2013.01); *H04W 76/14* (2018.02); *H04L 41/12* (2013.01);
(Continued)

(58) Field of Classification Search
CPC ..... H04L 41/0806; H04L 41/12; H04L 12/44; H04W 76/14
See application file for complete search history.

(56) References Cited

U.S. PATENT DOCUMENTS

| 10,306,704 B1* | 5/2019 | Wang | H04W 84/02 |
| 2013/0137377 A1* | 5/2013 | Endo | H04N 7/185 |
| | | | 455/66.1 |

(Continued)

OTHER PUBLICATIONS

Semtech; LoRa Modulation Basics; Journal; Revision 2, May 2015; Semtech Corporation Camarillo, CA.
(Continued)

*Primary Examiner* — Un C Cho
*Assistant Examiner* — Yu-Wen Chang

(57) ABSTRACT

Low data rate wireless electronic devices utilizing a hub- or star-based network topology, operational at ranges of thousands of meters. Remote end-devices may be such things as keypads, door latches, occupancy monitors, sprinkler controllers and other devices controlled or monitored in a campus or a collection of buildings. End-devices operate at intermediate ranges in RF congested areas and failure-intolerant situations through the use of discrete programmable channels. Each end-device carries a unique identifier and uses a common default initialization channel to accept an operational channel assignment from the hub, without a configuring or programming step at the end-device by an installing person. After assignment the end-device can utilize a low-power listening mode that avoids processor-awakening events due to orthogonality of the operational channels. Detailed information on various example embodiments of the inventions are provided in the Detailed Description below, and the inventions are defined by the appended claims.

20 Claims, 4 Drawing Sheets

Synchronous Mode

(51) Int. Cl.
*H04W 72/04* (2009.01)
*H04L 12/26* (2006.01)

(52) U.S. Cl.
CPC ......... *H04L 43/10* (2013.01); *H04W 72/0453* (2013.01); *Y02D 70/00* (2018.01); *Y02D 70/142* (2018.01); *Y02D 70/162* (2018.01)

(56) References Cited

U.S. PATENT DOCUMENTS

| | | | |
|---|---|---|---|
| 2013/0229996 A1* | 9/2013 | Wang | H04W 72/0413 370/329 |
| 2014/0056215 A1* | 2/2014 | Rajurkar | H04W 76/02 370/328 |
| 2015/0181619 A1* | 6/2015 | Kubo | H04W 72/06 370/329 |
| 2016/0255656 A1* | 9/2016 | Lou | H04L 1/0026 370/335 |
| 2017/0006533 A1* | 1/2017 | Gould | H04L 12/28 |
| 2017/0019927 A1* | 1/2017 | Kim | H04L 5/0055 |
| 2018/0376486 A1* | 12/2018 | Ahn | H04W 84/12 |

OTHER PUBLICATIONS

N.Sornin,M.Luis,T.Eirich,T.Kramp,O.Hersent; LoRa Alliance; Journal; Jan. 2015 V.1.0; LoRa Alliance, Inc.

Semtech;Wireless, Sensing & Timing SX1272/73; Journal; Rev. 3 Mar. 2015; Semtech Corporation Camarillo, CA.

Semtech;Wireless, Sensing & Timing SX1276/77/78/79; Journal; Rev. 4 Mar. 2015; Semtech Corporation Camarillo, CA.

* cited by examiner

FIG. 4
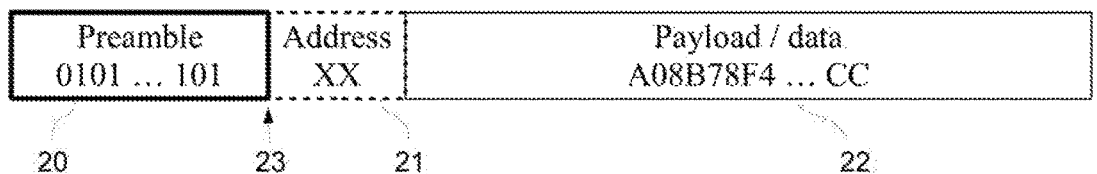
FIG. 5
FIG. 7
FIG. 6
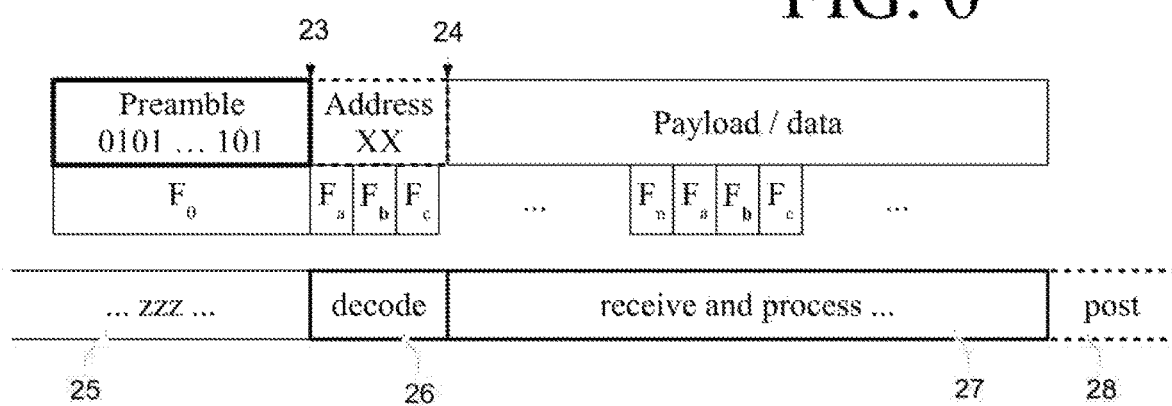

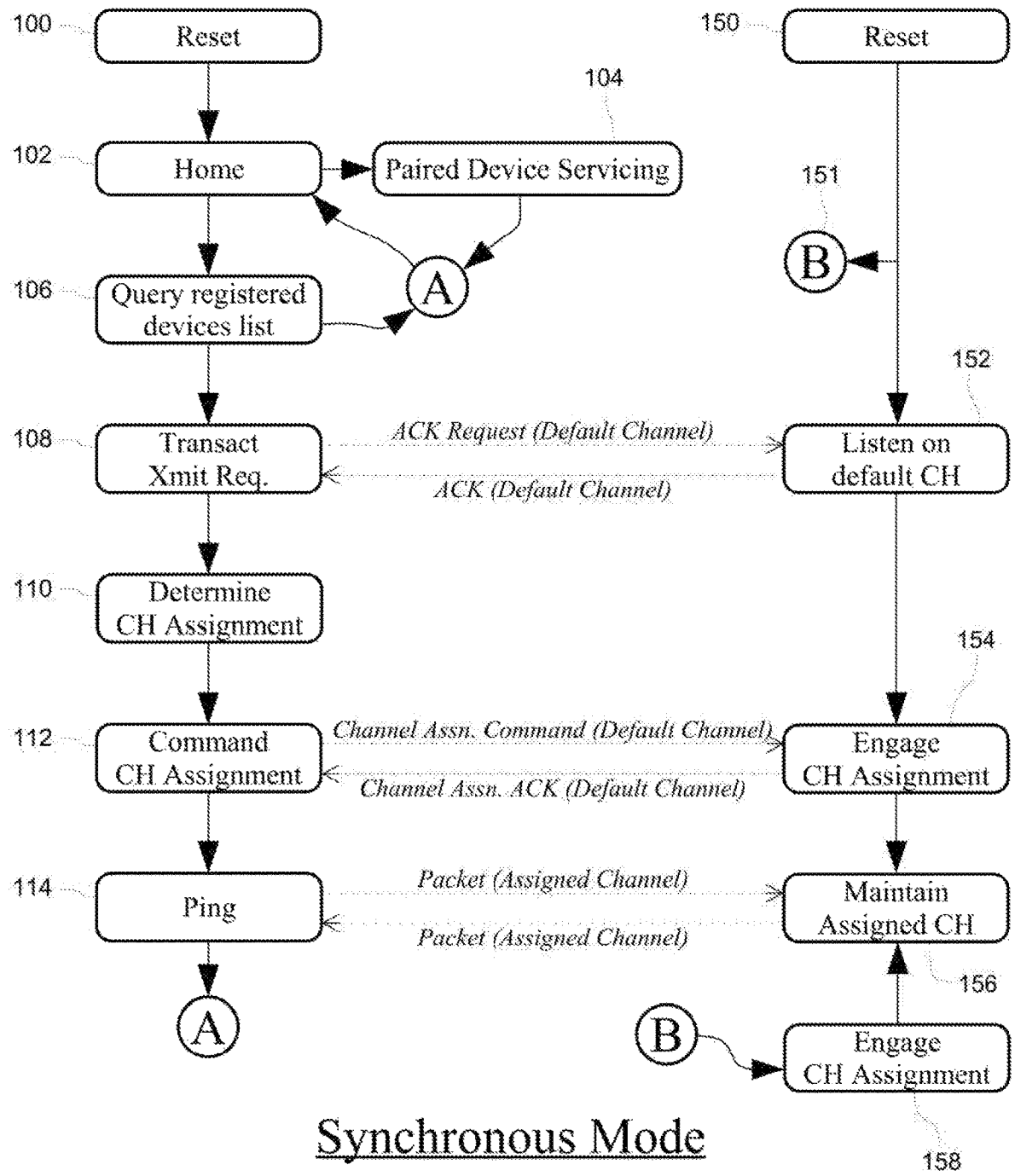

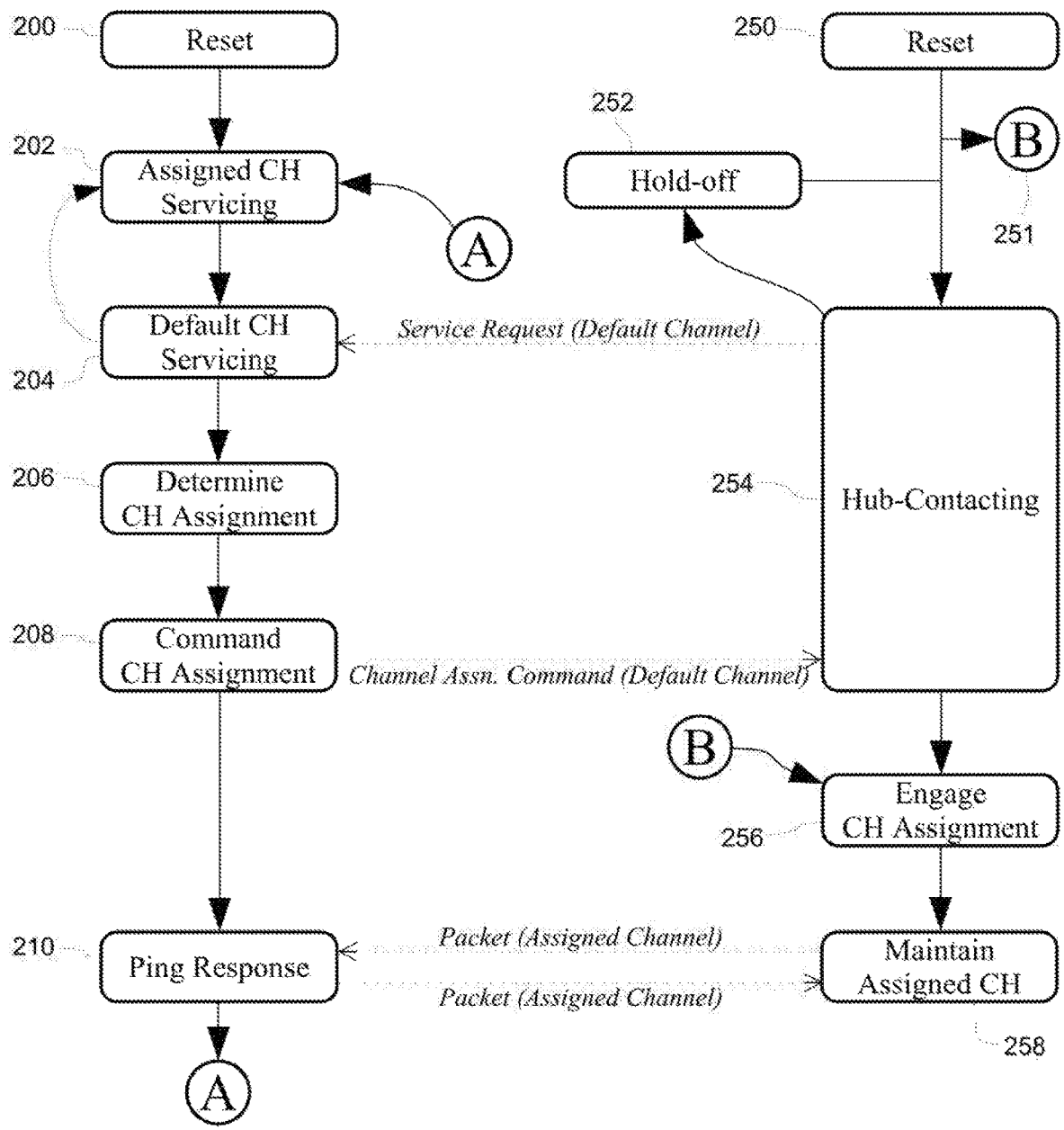

DEVICES AND SYSTEMS FOR CONSUMER-INSTALLED HUB-BASED INTERMEDIATE-RANGE PACKETIZED WIRELESS NETWORKS UTILIZING ASSIGNABLE OPERATIONAL CHANNELS

BACKGROUND

In recent history, relatively inexpensive electronic devices have become available to ordinary property-owners that wish to monitor and control various aspects of their properties. A recent concept called the "Internet of Things" imagines home-related electronic devices that can be reached through the Internet, by which an environment can be controlled, e.g. lighting, temperature, digital video recorders, and many other "smart" devices. That kind of device ordinarily requires a connection to a network switch or hub, which connection can be wired or wireless.

Wireless connections to such smart devices are often desired, particularly in existing constructions, avoiding the laying of wires in existing walls and other structures. Existing technologies serving this purpose include low-wattage devices that communicate using the 2.4 GHz 802.11b/g "WiFi" protocol, and other more-recent and similar protocols such as Zigbee and Z-Wave. These protocols generally permit data rates of 100 k bytes per second or more, allowing for devices that transmit and forward audio and video data in substantial real-time. However with high data rates come a vulnerability to interference from other devices operating on the same radio bands, and accordingly devices using these short-range protocols are generally limited to service within a single residence or building within a distance of less than 100 meters.

Recent technologies have been developed that permit operation to an intermediate range, communicating between points that are several miles or more away, for example using the LoRaWAN protocol. In this type of network, interference reduction is achieved by using frequencies in the UHF band and by including redundancies in communication, using for example multiple sampling, multiple frequency (spread-spectrum) techniques, and/or error-tolerant protocols. The use of the UHF band avoids interference from over-the-horizon sources, while at the same time avoiding some attenuation-of-signal from water-vapor, precipitation, buildings and other physical obstructions. These redundancies and protocols necessarily reduce the data throughput such that audio and video data cannot be streamed in good quality or in real-time.

An exemplary use of intermediate-range communication is in the recent deployment of wireless utility meters. Having a utility meter that can be read without a person traveling to and visually looking at it is a substantial cost savings for a utility. For such a use a meter communicates two items of information, which are an identifier for the meter and the meter reading itself; the utility takes a pair of such items and generates a bill for a utility subscriber. Because utility bills are ordinarily generated once per month, the amount of data from a single meter is usually on the order of a few tens of bytes in that period. Thus tens or even hundreds of thousands of meters can share a single intermediate-range channel, largely without interference from other devices.

The existing intermediate-range techniques, however, aren't conducive for applications where interactivity is need. For a channel sharing thousands of meters, it isn't necessary to resolve collisions between devices in a matter of milliseconds, because the data transmission can be delayed without significant impacts. In another example, an irrigation controller will ordinarily keep a set of sprinklers on for minutes at a time, and a delay of multiple seconds or even minutes is tolerable. In contrast, a person activating a light switch, for example, will not accept activation of lights with perhaps more than a one-second delay. Where a person enters a code on a keypad to enter a building, he expects a controlled lock to deactivate in real-time. In general, the existing intermediate-range technologies are fault-susceptible and not reliable for such interactivity, particularly where multiple devices share a common communications frequency or channel.

Interactivity issues for battery-powered devices can be even worse. For these devices, it is generally undesirable to keep a receiver continuously powered, and worse to repeatedly being awakened from a sleep mode to process and discriminate packets destined for other devices. The LoRaWAN Class A and B protocols address this by having end-devices turn off their receivers for long periods of time, waking up periodically to interact with a network gateway. Such a device may remain asleep for seconds, minutes or even hours, and thus cannot be made responsive to incoming queries. Furthermore, these protocols are susceptible to collisions from co-transmitting devices, which may require backing off interactions with a hub, and no time of reception can be guaranteed. Thus absent from the field of the invention is a system that can provide adequate and reliable service for groups of sensed and controlled remote devices at intermediate ranges.

BRIEF SUMMARY

Disclosed herein are low data rate wireless electronic devices utilizing a hub- or star-based network topology, the network being operational at ranges of thousands of meters. Remote end-devices may be such things as keypads, door latches, occupancy monitors, sprinkler controllers and other devices controlled or monitored in a campus or a collection of buildings. End-devices are functional at intermediate ranges even in RF congested areas and in failure-intolerant situations through the use of discrete programmable wireless channels. Each end-device carries a unique identifier and uses a common default initialization channel to accept an operational channel assignment from a hub, without a configuring or programming step at the end-device by an installing person. After assignment the end-device can utilize a low-power listening mode that avoids processor-awakening events due to orthogonality of the discrete operational channels.

BRIEF DESCRIPTION OF THE DRAWINGS

FIG. 4 shows an exemplary wireless data packet structure that includes a preamble and a variable payload.

FIG. 5 illustrates an exemplary frequency-sequence table usable in digital spread-spectrum communications between a hub and an end-device.

FIG. 6 depicts typical power states of an end-device through the course of reception of one kind of intermediate-range wireless packet.

FIG. 7 shows an exemplary set of discrete and orthogonal wireless channels for communication between a hub and a set of end-devices.

FIG. 8 depicts a typical set of states for a hub and an end-device being configured from a default initialization channel in synchronous mode to operate on an assigned channel.

FIG. 9 depicts a typical set of states for a hub and an end-device being configured from a default initialization channel in asynchronous mode to operate on an assigned channel.

DETAILED DESCRIPTION

Figure 1:
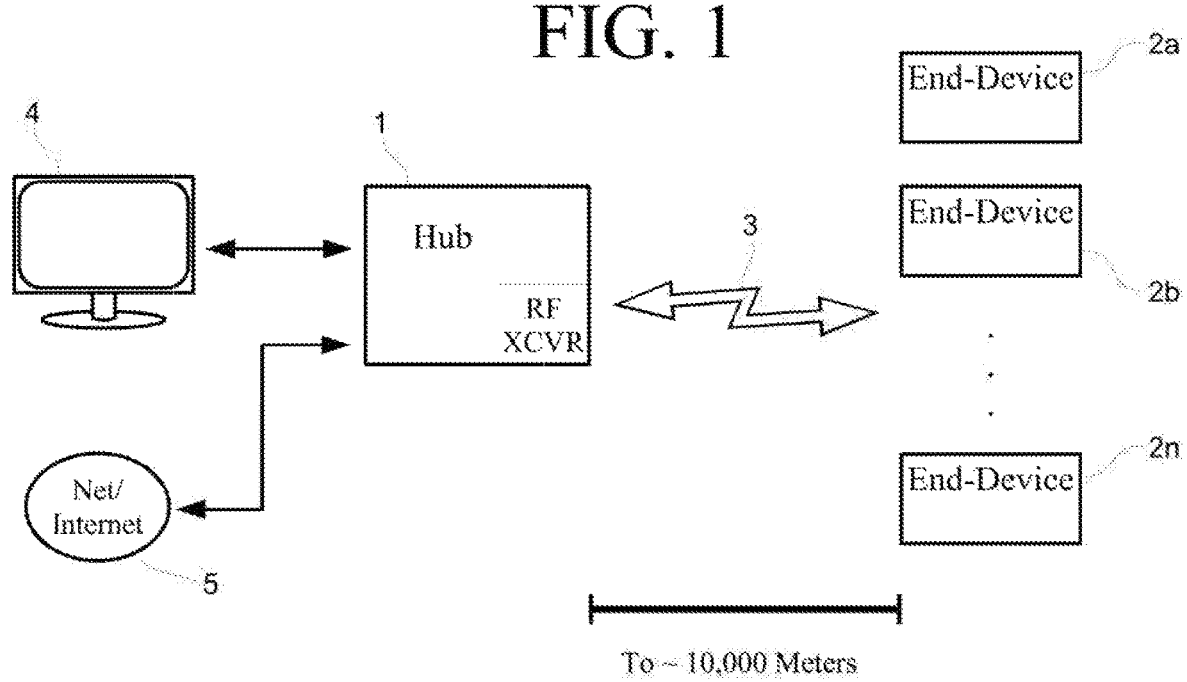
FIG. 1 depicts a network topology utilizing multiple end-devices and an interactive hub.

Shown in FIG. 1 is an exemplary network topology where the claimed inventions can serve particularly well. A hub 1 is placed within wireless range of end-devices 2*a-n*, communicating 3 over the airwaves at a distance of up to 10 KM or more, depending upon environmental conditions. In many cases, end-devices 2 are electronic devices that accept commands and transmit information to a controlling hub 1. Included in hub 1 and each of end-devices 2*a-n* is a processor, software for performing the functions of the device, and an RF transceiver. Hub 1 could be an ordinary personal computer with an RF adapter or card, or it might simply look like a box with an antenna and a port or interface permitting configuring and monitoring; it is foreseen that a manufacturer would likely supply a hub 1 in a ready-to-use state such that an installer need not open its case or install any software. In one configuration, hub 1 is connectable to a personal computer 4, for example through a USB interface, computer 4 having installed thereon software functional to configure and monitor the hub 1. In another configuration, hub 1 has a network port whereby communications may be had with network 5. These communications may be through any conceivable type or protocol. In one example a hub 1 sends messages through a TCP/IP sockets-based protocol to a proprietary server existing on the network 5. In another example, hub 1 has software that permits it to be seen as an HTTP server from any device on network 5. Thus in some installations, hub 1 may be connected directly to and accessible from the Internet, allowing for access from any Internet-connected device. The antenna of hub 1 will typically be elevated and located in an obstruction-free locality to maximize signal-strength with end-devices 2.

End-devices 2 are preferably manufactured in an unconfigured state, ready for pairing with a hub 1, each device having a unique identity (UID) to discriminate it from others. Such end-devices 2 can be of varying types, providing many kinds of control and sensing functions. In one example, an end-device has an infra-red motion sensor built in, includes programming to record the time of the last motion event, and may also include programming to initiate a notification packet to a hub 1 upon a motion-sensing event. In another example, an end-device includes a keypad whereby a person can enter a code, upon which a message is sent to hub 1 containing a sequence of keypresses. Such an end-device may be paired with another device which activates and deactivates a door latch, by way of messaging from hub 1, and the hub contains programming and configuration to read the keypad end-device and control the latch end-device as correct codes are entered. In a further example, several end-devices 2 are located throughout a building, sensing the temperature at various locations. Another end-device 2 controls a central-air system, providing heating and cooling to the building at the direction of hub 1 without human intervention based upon thermostat data forwarded through hub 1. The kinds of end-devices 2 that can be employed are virtually limitless, so long as they are electronic and provide either a control or a sensing function while staying within the available data throughput limitations.

Figure 2:
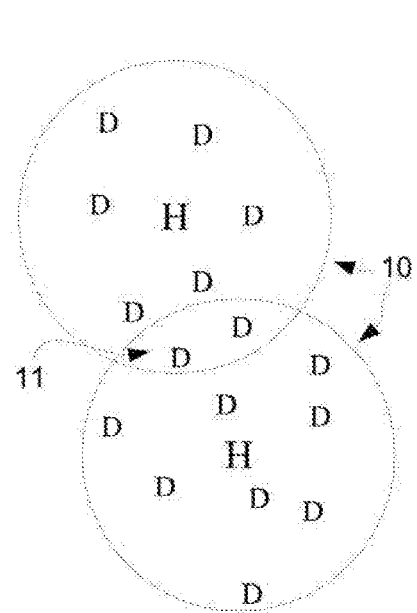
FIG. 2 depicts potential interference in two proximal short-range wireless networks.

Now turning to FIG. 2, two proximal short-range networks are conceptually shown, such as those constructed from devices communicating through the 802.11g protocol, for example using the Zigbee specification. In the example two property owners each operate a hub "H" servicing multiple devices "D", and as shown the figure the circumference of effective communication 10 of each hub is proximal so as to create a zone of interference 11. Communication with the devices in that zone can be affected by communications with a non-subscribing hub, so as to introduce possible packet transmission collisions and interference. However, because these networks are short-range, the zone of interference 11 is relatively small, and the frequency of collisions and interference is likewise negligible. Proximal operators of such networks can experience impacts, but because of the short-range and the short transmission time of packets, these impacts are minor and usually acceptable.

Figure 3:
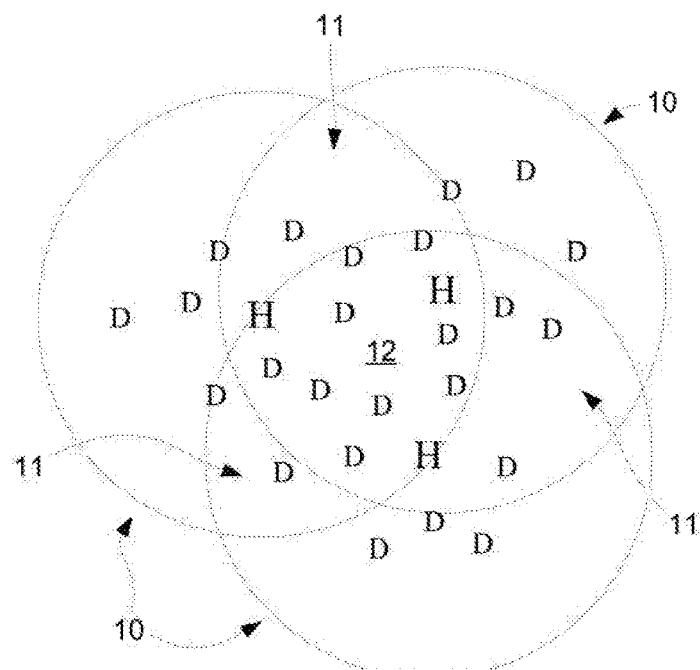
FIG. 3 depicts potential interference in three proximal intermediate-range wireless networks.

In contrast and as shown in FIG. 3, three intermediate-range networks are located in similar proximity, each with a hub "H" and subscribing devices "D". Because of the greater distance of communication provided, most devices "D" are located in zones of interference 11, and many devices may be located in regions 12 where several hubs are located within range. Thus where intermediate-range networks are to be used, most communication between hubs and devices should be expected to take place under conditions of interference, especially when located within a city or other populated area. Utility meter reading and other existing installations using the LoRa or LoRaWAN protocols manage this congestion by being the only network in the radio locality on a particular frequency, and by infrequent packet transmission on the order of once per week or month such that collisions between devices aren't likely. Utility meters are configured and installed by the utility provider, who can limit the number of end-devices within a locality to ensure network reliability. Because the provider is the only consumer of the applicable bandwidth resources, it can effectively control interference and manage congestion.

Unavailable on the consumer market today are hubs and end-devices that can operate at intermediate ranges. The short-range "WiFi" 802.11b/g network is now so popular that in most urban areas there is a router within communicative range no matter where a person finds himself; most households using the Internet now have one, purchased from a retailer. If the range of those routers and the devices they service were to be extended to an intermediate range, the result would be a collapse of system functionality from overwhelming interference. Thus, in order to bring intermediate-range devices to the ordinary consumer, further development is needed.

Described herein are electronic devices that are functional at intermediate ranges even in populated or congested areas, providing for simple installation by an ordinary home- or business-owner, as will presently be described and shown. These devices can be made reliable enough to use in failure-intolerant situations, such as security systems, even where an RF spectrum is congested. Remote devices can be made to operate on battery power, use low-power transmitters, and in many cases made to operate through the sending of a single bit per packet. Equipment can be made to fit in a hand-held enclosure, e.g. with a small omnidirectional antenna operating in the UHF frequency band. It is sometimes the case that a low-data rate network device will be desired to be placed in a location where power is available, but where neither network cabling nor a WiFi network is available. This kind of application is particularly suitable for intermediate range equipment. One kind of intermediate-range technology is known as "LoRa", descriptions of which are publicly available from the LoRa Alliance of San Ramon, Calif., which maintains a website at www.lora-alliance.org.

Shown in FIG. 4 is the structure of a simple data packet which may be used in communication between a hub and an end-device, a sub-type of which is used in the LoRa protocol. The structure has three parts, which are a preamble 20, a data payload 22, and an optional address 21. Payload 22 is generic and can contain many kinds of data as desired, depending upon the functions provided by an end-device. Payload 22 will often contain a command or a response, for example a command to open a latch or a response that a power switch is presently in an "on" state. Address 21 discriminates between devices operating on the same communications channel, and may not be needed where a single hub and end-device pair are the sole devices operating on that channel. Preamble 20 is present to provide synchronization for a radio-frequency receiver, at a hub or an end-device, at a programmed frequency such that the receiving device can decode the contents of the packet. A preamble is preferably a fixed, identifiable and unnatural pattern that can be recognized by a simple state machine without starting a general-purpose processor. The packet structure of FIG. 4 can be transmitted using many modulation techniques; LoRa devices use frequency shift keying for interference immunity, although other modulations can be used in accordance with the dictates of a particular operating environment.

Packets can be transmitted over a single carrier frequency, if desired, but because of benefits including resistance to noise and reduced impacts on particular parts of a frequency spectrum, spread-spectrum modulation has become popular. In this modulation technique, a sequence of frequencies is provided at a transmitter and a receiver; although in traditional encrypting systems the sequence might be generated by a pseudo-random generator with a secret seed and function parameters (which still can be used), for noise resistance and spreading of Tx power all that is needed is a sequence of frequencies uniformly spread over a given available set. This can be accomplished by the inclusion of a table as shown in FIG. 5, containing a sequence of n frequencies. In the example, each frequency $F_x$ is indexed by a sequence number $I_n$, such that the current operational frequency can be determined as a function of time from a point of synchronization, for example the end 23 of the preamble of a packet as in FIG. 4. The arrangement of frequencies in a sequence may be incremental, random, or in any order desired, keeping in mind that use of each frequency an equal number of times will result in the desired uniformity.

The transmission of a packet using this modulation technique is as shown in FIG. 6, beginning with the preamble at a known initial frequency $F_0$. The preamble is preferably not just a square wave, but a pattern whereby synchronization point 23 can be positively determined. The transmitter then sequences through the frequencies at a known period, mirrored by the receiver. For noise and interference immunity the sequence period is preferably much shorter than the time needed for each bit or symbol, but longer periods can be used to achieve a spreading of power across a spectrum. The sequence period should preferably be much shorter than the time of preamble transmission, such that preambles are easy to distinguish.

The power consumption of a transmitter is necessarily high during packet transmission, most of the power likely being consumed by the Tx output stage circuitry. A receiver, on the other hand, can implement a power-conserving procedure. Referring again to FIG. 6, the processor of a receiving device maintains itself in a state of sleep 25 while processing and receiving activities aren't underway; this can be particularly important for certain kinds of devices, especially for end-devices reliant upon battery-power, such as those with solar cells. A receiving device has built thereinto its receiving circuit an automated preamble recognizer; when recognition occurs a signal is sent to a processor to awaken and enter an active state of packet decoding 26. In the example of FIG. 6 an address is used, and the receiving processor performs functions needed to determine if the address in the packet is for its device. If an address is decoded and the packet is determined to be destined for another device, the processor can reset and go back to a sleeping state 25. For maximal power savings, therefore, an address is preferred to be toward the front of a packet. Where an address is matched, or where an address isn't used, a processor enters states of receiving and processing incoming data 27 and post-receipt processing 28 as needed. So in order to keep the processor of a particular device in a non-active state, it is important to positively discriminate the receipt of preambles of packets directed to the device from the preambles of other devices.

Herein is described a scheme of such discrimination by the segmentation of available packets into those of definite channels, each channel configured to avoid the unnecessary receiver power-up events on non-destination devices. Channels are preferably "orthogonal" to each other as well, meaning that communication on one channel is very unlikely or practically impossible to interfere with communication on another. In one of the simplest channel designation schemes, each channel is assigned a unique and available center frequency per channel, for example as was done on the now-obsolete analog television spectrum. A one-to-one relationship is made between transmitters and frequencies in a radio locality, and all devices are to use only their assigned spectrum and nothing outside. For example, the 902-928 MHz ISM band could be divided into 52 500 kHz-wide channels, or 208 125 kHz-wide ones. Given that an intermediate network supporting ordinary consumers might have a range of many kilometers and thousands of end-devices, that is considered an insufficient number to avoid interference. Therefore further methods of discrimination are preferably used.

Introduced now are certain transceivers made for the LoRa protocol, commercially available from Semtech Corporation, which are identified as the SX127x product line. Note that there are transceivers available from other manufacturers that are equally suitable; these Semtech ones are used in this description merely out of convenience as a basis for discussion. These products are designed to be coupled to a microcontroller handling communication channel configuration and packet management, and have settings for a carrier frequency, signal bandwidth and the number of "chips" per symbol (6 settings), a chip being the smallest datum used in communication. Each combination of those represents substantially a unique channel orthogonal to others, potentially permitting collision-free communication where there is no more than one transmitting device per channel. Using such combinations, two channels may share a common carrier frequency or DSS carrier sequence, while still maintaining orthogonality. Other settings can be used to make additional channels having "partially-orthogonality" including an address, a bit rate, a CRC rate, an encoding type (Manchester/whitening/none), and others according to the manufacturer specifications; note however that the use of partially-orthogonal channels can result in processor-awakening events for packets destined for unintended end-devices, although they can be greatly reduced.

Upon identification of a useful set of channel combinations, a table can be constructed as shown in FIG. 7, each channel having a unique combination of settings useful for communication. In this example, each channel is assigned a spread-spectrum frequency sequence (FS), a spreading factor (SF), and a bit rate (BR) of communication. In one configuration, available frequency sequences are spread evenly over channel assignments, such that the preamble for each channel is sparsely or uniquely used—that is a device transmitting a packet on an assigned channel would use the first frequency in the sequence while transmitting the preamble, followed by the use of other frequencies in sequence. Other channel combinations can be varied in accordance with needs present, for example a frequency sequence could be replaced with an operating frequency where spread-spectrum communication was not used.

Upon determining a set of channel combinations, assignments can be made for individual devices. Again some devices are tolerant of long latencies, and no special treatment of these is required. Other devices serve better being on a channel that is free or substantially free of conflicts. The assignment of a channel to a hub and an end-device requires a setting at both, and this could be made by a manufacturer or its representative at the time of installation.

Now described is a more advanced method of assigning a channel to an end-device usable by an ordinary consumer, that is a property owner, electrician or maintainer with ordinary skills. That is attainable through the use of a dedicated default channel and negotiation, adapted for the particular hub to end-device relationship in use. A dedicated channel is selected from a list of available ones, where each end-device starts on or returns to when there is a lack of confidence in a present channel assignment. Particular channel assignments are managed by the hub to which an end-device is to be paired, which assignments can be by several means as discussed below. The procedure to which channel assignments are negotiated depends upon whether communications with an end-device are prompted or spontaneous, or in other terms synchronous or asynchronous with respect to hub communication on the default channel.

In synchronous mode, all communications from end-devices are made in response to a request or permission from a hub. A hub transmits a packet to each end-device in turn, granting (explicitly or implicitly) the end-devices a window in which to respond. In analogy, the hub acts as a chairperson to a room full of speakers, the chair deciding who should speak and when, each end-device only "speaking when he's spoken to". In asynchronous mode, an end-device sends a packet when it is ready, potentially at the same time as another end-device causing a packet collision. A hub responds to an end-device with a packet acknowledging (again either explicitly or implicitly) receipt of the end-device's communication. After a time, if a transmitting end-device does not receive that acknowledgment, it may retransmit the packet as many times as needed. This is analogous to a room full of people who may potentially speak to a chairperson whenever they wish to "out-of-order". Either mode of communication can be used on a default channel, and indeed a hub can be designed that uses only one mode or switches between both, depending upon the need.

Now depicted in FIG. 8 are state-machine representations of a channel negotiation between a hub and an end-device using a synchronous mode, with successive states generally proceeding down the page. Each starts in a reset state on power-on, 100 and 150 for the hub and end-device, respectively. On reset 150 the end-device completes some initialization activity, after which one of two things happens. If the end-device has non-volatile memory and if a channel assignment is found to be stored therein, the device can skip 151 the channel assignment procedure and simply set up the communications hardware for the saved channel and resume operation as in step 158. Otherwise the device enters a state of listening for an acknowledgment request on the default initialization channel 152. The end-device may leave this listening state intermittently or as needed to manage other needs, as responding to such a request is not a critical action. As an acknowledgment request is first used by the hub to confirm communication in the moment, that request can be any packet that elicits an immediate response from the device, indicating it is in a state to receive a further command.

From initialization, the hub proceeds to a home state 102. The servicing of devices already paired will ordinarily take priority over pairing end-devices, and according in its ordinary operating state the hub will first determine whether there are any already-paired devices that need to be serviced. If so, the hub enters a servicing state 104, performs various activities depending upon the end-device type getting present attention and other factors, and returns home 102 when finished. Otherwise, the hub enters a query state 106 in which the list of registered end-devices is checked for ones that are needing to be paired with and possibly assigned to an operational channel.

Conceptually, the list of registered end-devices provides a way to give each hub awareness of which end-devices should be serviced, as there may be end-devices owned or operated by others within radio locality that should be ignored. On a hub, this list can exist by itself or as a part of other data or structures. In a synchronous mode, this list is most simply a list of unique identifiers (UIDs) by which intended end-devices may be recognized and addressed. Ordinarily this list will also contain a flag or information that indicates whether a device is paired, and the channel to which the device is assigned or the parameters thereof. This list may, if desired, keep other information such as device types, times of previous communications, battery information, servicing requests, error information and many other things. The hub provides a way to edit and reconfigure this list, such that the list may be changed as end-devices are added to or removed from a desired system. In one example, a hub contains a network port, an HTTP server, and server software that permits the editing of the list through a browser on a connected network computer. In another example, the list is maintained as a file on a memory device that can be inserted into the hub where it can be read. In a third example, the hub has a proprietary port and protocol permitting a technician access to the list from a specially-designed programmer. And in a cloud-based example, the hub may make an Internet query at determined times for changes to be made to the list, adding newly registered end-devices or redacting ones as needed. The way in which the list of registered end-devices can be accessed may be widely varied according to the specific form of the hub and interfaces provided therein.

When the hub identifies in state 106 a registered device needing to be paired, it moves to a new state 108 in which the unpaired device is queried. The choosing of an unpaired device to be serviced can be at random, or by another ordering method, for example one that prioritizes the channel assignment of security devices over others. Such a querying is by way of the default channel, and accordingly the hub changes the transceiver used to match the parameters of that channel. In state 108 an acknowledgment request packet is sent to the unpaired device, again on the default channel, which will result in either receipt of a packet acknowledging the request or a timeout. The acknowledgment packet contains an identifier of the destination end-device, which may be the device's unique identifier (UID). A timeout indicates that the unpaired device is off, out of range or unavailable in some other way, and accordingly no further transaction attempts with that device are needed. The hub returns to the home state 102 on a timeout.

If the end-device is listening in state 152 on the default channel and receives a packet from the hub identifying the device as the destination, the device responds within a set time with a return packet in acknowledgment. Upon receiving that acknowledgment packet, the hub moves from state 108 to state 110 where a channel assignment may be made. Now, a state 110 where a channel is assigned is optional, where channel assignments have been made previously. Channel assignments are dependent upon the particular end-devices to be used with a hub, among potential other things. One assignment scheme is to segment the devices between those that will tolerate communication latency from those that won't, and assign channels for the latter. Another scheme assigns channels to battery-operated devices so as to keep traffic to and from other devices off-channel, potentially saving power. Where channel assignments are made on-the-fly, as might be done if a state 110 is included, channel assignments can be made to ones that are least-populated Other assignment schemes can be crafted in accordance with the network environmental conditions, the devices used, and other factors as desired.

Upon determination of a channel assignment, the hub then enters a state 112 to attempt to communicate that channel assignment to the as-yet unpaired device. A command is sent to the end-device to make the channel assignment, which is now in or now enters state 154 to engage the new assignment. Note that this command may be received while the end-device is listening generally in state 152, if the communications protocol allows. The channel assignment command may either contain the channel parameters as explained above, or it may be a reference to the parameters, for example in a table of channels indexed by a number. Upon receiving that command, the end-device preferably sends back and acknowledgment to the hub that the channel assignment is accepted, following which its RF circuitry is configured for operation on the assigned channel. If non-volatile memory is available, the new channel assignment may be saved at the same time. Once the channel assignment has been put into effect, the hub and end-device then proceed to states 114 and 156, respectively. If there is any remaining setup to be done, it can be managed through communications on the assigned channel with the hub and end-device in those states.

It will sometimes be important for the hub to test a channel assignment periodically, which is a kind of guarantee that an end-device is active and communicating properly. In state 114 the hub sends a "ping" to the newly-configured end-device, on the newly assigned channel. After engaging the assigned channel to its radio transceiver, the end device maintains it communications 156 on the assigned channel, and in many cases uses the assigned channel for all further communication with the hub until a reset or until a further channel assignment is made. Any packet returning a packet in response can act as a ping, and the hub may send pings when it is in the usual paired device servicing 104. The failure to receive a ping at an end-device within a set time may cause it to enter a fail-safe procedure, essentially returning to state 152. Similarly, the failure of an end-device to return a packet in response within a set time may indicate a failure of that device to communicate in the assigned channel, and the list of registered end-devices can be updated to indicate that a device is no longer paired or a channel assigned. As conditions change in the radio environment, new channel assignments can be made by the hub for an end-device by the issuance of a channel assignment command on the presently assigned channel, or by waiting for a fail-safe event at the end device and then following the procedure of FIG. 8.

Now turning to FIG. 9, a channel negotiation is represented using an asynchronous mode. In this example, the hub has a single transceiver that can switch between channels. In asynchronous mode, the hub in a normal state 202 scans through the assigned channels, waiting for transmission of a packet from a paired end-device. In some encoding schemes, including FSK, a packet under transmission can be detected by the presence of a signal for a short time, perhaps the length needed to transmit a single symbol. Note that it isn't necessary to scan any unassigned channels, that is channels that are available but for which no end-device as been commanded to operate on. While scanning the assigned channels, the default channel must be left unserviced. Periodically, however, the default channel may be serviced 204. If no activity is detected, the hub may return to servicing the assigned channels 202.

The end-device starts from reset and initialization 250, and as in synchronous mode if a channel assignment is stored in non-volatile memory the device may skip 251 the channel assignment procedure, going straight to setting the RF electronics parameters appropriately 256. If no channel assignment can be determined at reset, the end device proceeds to a hub-contacting state 254, in which the device attempts to be serviced by the hub. The end-device transmits packets intended for the hub, those packets including a unique identifier and indicating the presence of the end device on the default channel. Immediately following a service request packet, the end-device listens for a response.

Now in asynchronous mode there are two main failure modes of communication. The first of these is caused by the hub not being ready to receive a packet on the default channel, either because it is set to receive on another channel or because it is servicing other processing needs at the time. The second of these is from collisions, that is other end-devices that happen to transmit packets at the same time as the one attempting to be serviced. Either way, if an end-device doesn't receive a packet from the hub within a set time, a hold-off state 252 is entered to give the failure mode a chance to clear. The end-device remains in hold off state 252 for a period calculated to be likely to avoid the failure mode, for example an exponentially-increasing period with some randomization to avoid other-device collisions, following which the end-device returns to the hub-contacting state 254.

Eventually, the end-device will be successful in sending a service request to the hub. First, the hub verifies that the end-device's UID is in a list of registered end-devices. If a packet is received that is from a non-registered device, it is assumed to be registered with a different hub and ignored, in which case the hub returns to state 202 to service devices on a different channel while the default channel is occupied. If a packet is received from a registered device, a channel assignment is then determined 206 for the end-device that requested service, which is similar to that in the synchronous mode, and if a channel assignment has been made, the hub need only look up the channel or its parameters. Once a channel assignment has been determined for the end-device, the hub proceeds to state 208.

The hub in state 208 sends a packet back to the end-device containing a command with the channel assignment or the parameters thereof. Ordinarily it will be important for this determination to be made quickly, so the channel assignment command packet is sent promptly to the end-device, which is waiting for it after having sent the service request. Note, however, that it is possible to utilize a Cloud-access for the reading of the registry or the channel assignment, provided the end-device is configured to remain in state 254 for a longer period of time (perhaps seconds) before proceeding to the hold-off 252. Upon receipt of a channel assignment command, the end-device proceeds to state 256 where it switches its RF circuits to the new channel. If non-volatile memory is available, the new channel assignment may be saved at the same time. When done, the end-device proceeds to a normal operational state on the assigned channel 258. Any remaining setup to be done can be managed through communications on the assigned channel with the hub and end-device in that state.

In an optional confirming mode of operation, the hub switches to the assigned channel and then waits for a period of time 210 for a packet to arrive on that assigned channel from the end-device. That packet can be a simple ping, or it can contain further information, requests or a command response from the end-device. Regardless of whether the channel assignment is confirmed, the hub returns to normal operation and state 202 for further end-device servicing. Where the confirming mode is used, it is preferred that the end-device wait for a short and fixed period of time calculated to allow for the reconfiguration of the RF circuits before sending that packet so the hub can confirm and resume without unnecessary delay.

The LoRaWAN protocol, particularly Classes A and B, use a mode of communication similar to the asynchronous mode described above, although only on a single channel with a single set of RF communications parameters. With the use of channel assignments comes a problem not experienced in LoRaWAN networks, which is this: where there are end-devices that do not store channel assignments in non-volatile memory, a power interruption can cause a large number of coinciding service requests for channel assignment, which for the asynchronous mode can flood the default channel and cause packet collisions and large delays in the restructuring of the intermittent network when power is restored. Furthermore, as in asynchronous mode end-devices are not ordinarily aware of each other, a prioritized channel assignment restoration can be difficult, potentially resulting in long periods of unavailability for critical devices. For this reason, where there are to be mains-powered end-devices that do not save their channel setting to non-volatile memory, the synchronous mode of communication is preferred.

Furthermore, even though a hub and an end-device may use a synchronous or an asynchronous mode of communication while using a default initialization channel, that mode may be varied after a channel has been assigned and set. This may be particularly helpful for devices that have urgent data to submit, such as security alarms or critical equipment failure messages. For example, a battery-powered perimeter end-device might initially use a synchronous communications mode on an initialization channel, following which it operates on an operational channel reserved for security alarms in asynchronous mode, transmitting wireless packets immediately and without prompting by a hub in the event of intrusion detection, continuing until a hub acknowledges receipt.

In the description above, communications are largely sent in the clear permitting interception of packet data, which may permit an outside party to snoop on the channel assignment activity and potentially to interfere with channel assignments of end-devices. In this way, a malicious party might inject unauthorized commands into the network (for example commanding door latches to open), snoop on the state of alarms, or commanding end-devices to switch to faux channels effectively disabling them. For this reason it is desirable to include security measures in the communication protocols to prevent this kind of attack. If LoRa-compatible hardware is used, then one security measure is to use a network session or application key, by which packets can be encrypted and unauthorized packets rejected. An additional security measure encrypts the UID of devices, such that all nodes on an intermediate network require possession of a key to decrypt the identity of the source or destination end-device; in this way the UID is never sent in-the-clear, making the acceptance of faux packets much more difficult for a malefactor to achieve. In another security method where digital spread-spectrum transmission is used, the frequency sequence is changed periodically by the hub, through a command to change channel parameters that include a new seed for the pseudo-random generator used to generate the sequence. A return to the default channel provides a fallback state in the event a hub and an end-device lose synchronization.

In a further variation, an assortment of default channels can be assigned and configured at the time of manufacture, selectable by the consumer at the time of purchase without a configuration step. In one example, hubs and end-devices are made with a default channel being selected from n preset ones, with each device being set at random, by an even distribution, or by some other scheme. The products are made available with different product codes or names, such that a purchaser can select the correct one with his desired default channel. For example, a purchaser having set up a hub on default channel 2 would purchase end-devices set to the same, and thus the step of configuring the default channel by the installer is avoided, while at the same time conveniently permitting several intermediate networks to reside in the same radio locality with minimal interference on their respective default channels.

Now although certain systems, products, components, functions and methods have been described above in detail for specific applications, one of ordinary skill in the art will recognize that these functions and methods are adaptable to other systems and products. Likewise, although the described functions have been described through the use of block and state diagrams, flowcharts, and software and hardware descriptions, one of ordinary skill in the art will recognize that most of the functions described herein may be implemented in software or hardware. State machines described herein may likewise be implemented completely in logic, as software executable on a general-purpose or embedded processor, or as a mixture of both. Some of the descriptions herein refer to specific protocols and modulation types, which are only exemplary; other protocols and types may be substituted as desired in accordance with the inventive concepts. More specifically, it is to be understood that although the accompanying description makes reference to the LoRa and LoRaWAN protocols and designs, the inventions described herein may be used in other kinds of intermediate-range networks, RF bands and using other equipment. The exact configurations described herein need not be adhered to, but rather the diagrams and architectures described herein may be varied according to the skill of one of ordinary skill in the art. Therefore, the inventions disclosed herein are to be fully embraced within the scope as defined in the claims. It is furthermore understood that the summary description and the abstract are provided merely for indexing and searching purposes, and do not limit the inventions presented herein in any way.

What is claimed:

1. A system of devices in communication at intermediate ranges, the devices utilizing a set of discrete radio-frequency channels having at least partial orthogonality, the set being divided between a default initialization channel and a set of operational channels, said system comprising:
    a hub comprising a radio-frequency transceiver functional for wireless communication over the set of discrete radio-frequency channels, said hub containing an electronic circuit implementing a state machine immutable to power-on or power-off events, said hub further containing a memory wherein may be stored an end-device registry; and
    a plurality of end-devices each comprising a radio-frequency transceiver functional for wireless communication over the set of discrete radio-frequency channels, each of said end-devices further containing an electronic circuit implementing a state machine immutable to power-on or power-off events, each of said end-devices having stored thereon a unique identifier, each of said end-devices further implementing a control or a sensing function, each of the plurality of said end-devices being physically located within communicative locality of said hub;
    wherein the state machine of said hub is configured to sequence through a set of states to implement the functions of:
        (a) initializing said hub electronic circuit and radio-frequency transceiver into a power-on state,
        (b) accessing a list of registered devices, wherein the list comprises a unique identifier for each registered device and an indication of whether the registered device is a paired end-device or an unpaired end-device,
        (c) servicing at least one paired end-device,
        (d) configuring the transceiver of said hub to communicate on the default initialization channel,
        (e) identifying an unpaired end-device,
        (f) sending an acknowledgment request packet to the unpaired end-device via the default initialization channel, the acknowledgment request packet comprising a unique identifier of the unpaired end-device,
        (g) receiving an acknowledgment packet from the unpaired end-device via the default initialization channel, the acknowledgment packet comprising the unique identifier of the unpaired end-device, wherein the acknowledgment packet is received by the hub within a set time following reception of the acknowledgment request packet by the unpaired end-device,
        (h) determining a segment assignment based on a type of the unpaired end-device, wherein end-devices in a first segment are assigned to one channel within the set of operational channels, and wherein end-devices in a second segment are assigned to the default initialization channel;
        (i) sending a channel assignment to the unpaired end-device via the default initialization channel in response to receiving the acknowledgment packet, wherein the channel assignment is based on the determined segment assignment, and
        (j) receiving a channel acknowledgement from the unpaired end-device via the default initialization channel, wherein the receiving of the channel acknowledgement results in a pairing between said hub and the unpaired end-device, such that the unpaired end-device becomes a paired end-device;
    wherein the state machine of each of said end-devices is configured to sequence through a set of states to implement the functions of:
        (k) initializing said end-device electronic circuit and radio-frequency transceiver into a power-on state,
        (l) on initialization or on loss-of-contact with said hub, configuring the transceiver of said end-device to communicate on the default initialization channel with said hub,
        (m) on the default initialization channel, receiving the acknowledgment request packet from said hub, the acknowledgment request packet comprising the unique identifier of the unpaired end-device,
        (n) sending the acknowledgement packet to said hub via the default initialization channel, wherein the acknowledgment packet is sent within the set time following reception of the acknowledgment request packet,
        (o) receiving the channel assignment from said hub, wherein the channel assignment is received in response to the acknowledgement packet,
        (p) sending the channel acknowledgment to said hub via the default initialization channel,
        (q) configuring the transceiver of said end-device to communicate on an assigned channel based on the channel assignment,
        (r) by way of the transceiver of said end-device, listening for a packet preamble on the assigned channel, and
        (s) conducting communications with said hub, either communicating sensing information of the end-device to the hub or receiving commands for functions controlled by the end-device from the hub, or both.

2. The system according to claim 1, wherein the radio-frequency transceiver of both the hub and each of said end-devices is configurable as to center frequency, spreading factor, bit rate and chips per symbol.

3. The system according to claim 1, wherein each of said hub and said end-devices include a table wherein the parameters of each of the discrete radio-frequency channels are recorded.

4. The system according to claim 1, wherein the type does not require frequent or prompt communication, and wherein said hub is configured to determine the segment assignment for that type of unpaired end-device is the second segment.

5. The system according to claim 1, wherein in each of said hub and all of said end-devices is stored an assignment for a particular default initialization channel, and further wherein a visual marking by which that assignment can be read is incorporated in said hub and each of said end-devices.

6. The system according to claim 1, wherein said hub and each of said end-devices are configured to communicate using synchronous mode on the default initialization channel.

7. The system according to claim 1, wherein said hub and each of said end-devices are configured to communicate using asynchronous mode on the default initialization channel.

8. The system according to claim 1, wherein the group of said end-devices include one or more power-interruption resistance end-devices that have a read/write non-volatile memory in which a channel assignment may be stored, wherein each of said power-interruption resistant devices stores channel assignments to said non-volatile memory at the time such channel assignments are received or engaged, further wherein each of said power-interruption resistant devices reads said non-volatile memory at power-up initialization and reverts to operation at a recorded assigned channel if one has been stored.

9. A hub designed for wireless communication with end-devices at intermediate ranges utilizing a set of discrete radio-frequency channels having at least partial orthogonality, the set being divided between a default initialization channel and a set of operational channels, each end-device being within communicative locality and having a unique identifier by which it can be distinguished from other end-devices, said hub comprising:
 a radio-frequency transceiver functional for wireless communication over the set of discrete radio-frequency channels;
 an electronic circuit implementing a state machine immutable to power-on or power-off events;
 a port by which end-device registry information can be received;
 a memory wherein may be stored an end-device registry; and
 wherein the state machine of said hub is configured to sequence through a set of states to implement the functions of:
  (a) initializing said hub electronic circuit and radio-frequency transceiver into a power-on state,
  (b) accessing a list of registered devices, wherein the list comprises a unique identifier for each registered device and an indication of whether the registered device is a paired end-device or an unpaired end-device,
  (c) servicing at least one paired end-device,
  (d) configuring the transceiver of said hub to communicate on the default initialization channel,
  (e) identifying an unpaired end-device,
  (f) sending an acknowledgment request packet to the unpaired end-device via the default initialization channel, the acknowledgment request packet comprising a unique identifier of the unpaired end-device,
  (g) receiving an acknowledgment packet from the unpaired end-device via the default initialization channel, the acknowledgment packet comprising the unique identifier of the unpaired end-device, wherein the acknowledgment packet is received by the hub within a set time following reception of the acknowledgment request packet by the unpaired end-device,
  (h) determining a segment assignment based on a type of the unpaired end-device, wherein end-devices in a first segment are assigned to one channel within the set of operational channels, and wherein end-devices in a second segment are assigned to the default initialization channel;
  (i) sending a channel assignment to the unpaired end-device in response to receiving the acknowledgment packet, wherein the channel assignment is based on the determined segment assignment, and
  (j) receiving a channel acknowledgement from the unpaired end-device, wherein the receiving of the channel acknowledgement results in a pairing between said hub and the unpaired end-device, such that the unpaired end-device becomes a paired end-device.

10. The hub as recited in claim 9, wherein the type does not require frequent or prompt communication, and wherein said hub is configured to determine the segment assignment for that type of unpaired end-device is the second segment.

11. The hub as recited in claim 9, wherein is stored an assignment for a particular default initialization channel of use specific to said hub, and further wherein said hub includes a visual marking by which that assignment can be read.

12. The hub as recited in claim 9, wherein said hub is configured to test the operational readiness of paired end-devices on assigned operational channels by way of commands sent in a synchronous communication mode, wherein those commands are sent at an interval less than a selected timeout interval.

13. The hub as recited in claim 9 further configured to reassign a paired end-device on a succeeding assigned channel using a command issued on a first assigned channel.

14. An end-device operable to communicate with a hub utilizing a set of discrete radio-frequency channels having at least partial orthogonality, the set being divided between a default initialization channel and a set of operational channels, said end-device comprising:
 a radio-frequency transceiver functional for wireless communication over the set of discrete radio-frequency channels;
 a unique identifier stored into non-volatile memory;
 a set of terminals or ports each operable to connect to a controller or a sensor; and
 an electronic circuit implementing a state machine immutable to power-on or power-off events, said state machine being configured to sequence through a set of states to implement the functions of:
  (a) initializing said electronic circuit and radio-frequency transceiver into a power-on state,
  (b) on initialization or on loss-of-contact with the hub, configuring said transceiver to communicate on the default initialization channel with the hub,
  (c) on the default initialization channel, receiving an acknowledgment request packet from said hub, the acknowledgment request packet comprising a unique identifier of the unpaired end-device,
  (d) sending an acknowledgement packet to said hub via the default initialization channel, the acknowledgment packet comprising the unique identifier of the end-device, wherein the acknowledgment packet is sent within a set time following reception of the acknowledgment request packet,
  (e) receiving the channel assignment from said hub, wherein the channel assignment is based on a segment assignment determined by said hub, wherein an end-device in a first segment are assigned to one channel within the set of operational channels, wherein an end-devices in a second segment are assigned to the default initialization channel, and wherein the channel assignment is received in response to the acknowledgement packet, (f) sending the channel acknowledgment to said hub via the default initialization channel, (g) configuring said transceiver to communicate on an assigned channel based on the channel assignment, (h) by way of said transceiver configured for the assigned channel and in a low-power mode, listening for a packet preamble, (i) where said end-device implements a sensing function, reading a sensor connected to one of said terminals or ports, (j) conducting communications with the hub, either communicating sensing information received at said terminal or port to the hub, or receiving commands for control functions from the hub, or both, and (k) where said end-device implements a control function, sending a control signal at one of said terminals or ports.

15. The end-device as recited in claim 14, further configured to transmit packets indicating operational presence on the default initialization channel.

16. The end-device as recited in claim 14, further configured to transmit packets indicating operational presence on an assigned channel, wherein those commands sent in asynchronous mode and at an interval less than a selected timeout interval.

17. The end-device as recited in claim 14 further having a read/write non-volatile memory in which a channel assignment may be stored, wherein said device stores channel assignments to said non-volatile memory at the time such channel assignments are received or engaged, further wherein said device reads said non-volatile memory at power-up initialization and reverts to operation at a recorded assigned channel if one has been stored.

18. The end-device as recited in claim 14, configured to control either a power switch or an entry device.

19. The end-device as recited in claim 14, configured to connect to a sensor selected from the group consisting of a keypad, a motion sensor, a thermometer and an alarm.

20. The end-device as recited in claim 14, wherein is stored an assignment for a particular default initialization channel of use specific to said device, and further wherein said device includes a visual marking by which that assignment can be read.

* * * * *